(12) United States Patent
Yang et al.

(10) Patent No.: US 11,347,506 B1
(45) Date of Patent: May 31, 2022

(54) MEMORY COPY SIZE DETERMINING INSTRUCTION AND DATA TRANSFER INSTRUCTION

(71) Applicant: Arm Limited, Cambridge (GB)

(72) Inventors: James Tsung-Lun Yang, Austin, TX (US); Richard William Earnshaw, Fulbourn (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/149,860

(22) Filed: Jan. 15, 2021

(51) Int. Cl.
*G06F 9/30* (2018.01)

(52) U.S. Cl.
CPC ...... *G06F 9/30043* (2013.01); *G06F 9/30145* (2013.01)

(58) Field of Classification Search
CPC .......................... G06F 9/30043; G06F 9/30145
See application file for complete search history.

(56) References Cited

U.S. PATENT DOCUMENTS

| 9,459,867 | B2 | 10/2016 | Bradbury et al. | |
|---|---|---|---|---|
| 2006/0253654 | A1 | 11/2006 | Adachi | |
| 2007/0106883 | A1 | 5/2007 | Choquette | |
| 2009/0249136 | A1* | 10/2009 | Halstvedt | G11C 29/48 714/718 |
| 2011/0314262 | A1* | 12/2011 | Fusejima | G06F 9/383 712/207 |
| 2013/0246378 | A1 | 9/2013 | Hearnden et al. | |
| 2015/0317164 | A1 | 11/2015 | Laine et al. | |
| 2017/0139709 | A1 | 5/2017 | Gschwind et al. | |

FOREIGN PATENT DOCUMENTS

GB 2543303 4/2017

OTHER PUBLICATIONS

Robert Bedichek, "Some Efficient Architecture Simulation Techniques", Proceedings of the Winter 1990 USENIX Conference, Jan. 22-26, 1990, 12 pages.
Jonathan Bradbury, et al., "z13 Vector Extension Facility (SIMD)", IBM, Session 16897, Mar. 3, 2015, 75 pages.

(Continued)

*Primary Examiner* — Zachary K Huson
(74) *Attorney, Agent, or Firm* — Nixon & Vanderhye P.C.

(57) ABSTRACT

An apparatus, method and computer program are described, the apparatus comprising decode circuitry configured to decode instructions, and processing circuitry responsive to the instructions decoded by the decode circuitry to perform data processing. In response to the decode circuitry decoding a memory copy size determining instruction specifying as operands a source memory address, a destination memory address and a total number of bytes to be copied from a source block of memory locations indicated by the source memory address to a destination block of memory locations indicated by the destination memory address, the processing circuitry is configured to determine, based on at least one of the source memory address and the destination memory address, a memory copy size indicating value indicative of a subset of the total number of bytes to be copied. A data transfer instruction is also described.

21 Claims, 9 Drawing Sheets

(56) References Cited

OTHER PUBLICATIONS

"Intel® 64 and IA-32 Architectures Software Developer's Manual", Intel, vol. 2B: Instruction Set Reference, M-U, Order No. 253667-073US, Nov. 2020, 6 pages.
"Power ISA™ Version 3.0 B", IBM, Mar. 29, 2017, 7 pages.
"PowerPC™ 601 RISC Microprocessor User's Manual", NXP, MPR601UM-01, MPC601UM/AD, Motorola Inc., 1995, 8 pages.
Office Action for GB Application No. 2100503.8 dated Oct. 22, 2021, 13 pages.

* cited by examiner

MEMORY COPY SIZE DETERMINING INSTRUCTION AND DATA TRANSFER INSTRUCTION

BACKGROUND

Technical Field

The present technique relates to the field of data processing.

Technical Background

In a data processing system, it can be useful to be able to copy data from one location in memory to another. For example, data may be copied from one location in memory to another in response to a memcpy( ) function in C. Such a process is typically controlled by software, and may have a large overhead.

SUMMARY

Viewed from one example, the present technique provides an apparatus comprising:
  decode circuitry configured to decode instructions; and
  processing circuitry responsive to the instructions decoded by the decode circuitry to perform data processing;
  wherein in response to the decode circuitry decoding a memory copy size determining instruction specifying as operands a source memory address, a destination memory address and a total number of bytes to be copied from a source block of memory locations indicated by the source memory address to a destination block of memory locations indicated by the destination memory address, the processing circuitry is configured to determine, based on at least one of the source memory address and the destination memory address, a memory copy size indicating value indicative of a subset of the total number of bytes to be copied.

Viewed from another example, the present technique provides a method comprising:
  decoding a memory copy size determining instruction specifying as operands a source memory address, a destination memory address and a total number of bytes to be copied from a source block of memory locations indicated by the source memory address to a destination block of memory locations indicated by the destination memory address; and
  in response to decoding of the memory copy size determining instruction, determining, based on at least one of the source memory address and the destination memory address, a memory copy size indicating value indicative of a subset of the total number of bytes to be copied.

Viewed from another aspect, there is provided a computer program to control a host data processing apparatus to provide an instruction execution environment for execution of target code, the computer program comprising:
  instruction decoding program logic to decode instructions of the target code to control the host data processing apparatus to perform data processing,
  wherein the instruction decoding program logic is responsive to a memory copy size determining instruction specifying as operands a source memory address, a destination memory address and a total number of bytes to be copied from a source block of memory locations indicated by the source memory address to a destination block of memory locations indicated by the destination memory address, to control the host data processing apparatus to determine, based on at least one of the source memory address and the destination memory address, a memory copy size indicating value indicative of a subset of the total number of bytes to be copied.

Viewed from another aspect, there is provided an apparatus comprising:
  decode circuitry configured to decode instructions;
  processing circuitry responsive to the instructions decoded by the decode circuitry to perform data processing; and
  a plurality of registers,
  wherein the processing circuitry is responsive to the decode circuitry decoding a data transfer instruction specifying a target memory address and a given general purpose register of the plurality of registers, to transfer data, having a size corresponding to a number of bytes specified by a data transfer size indicating value held in the given general purpose register, between the plurality of registers and a target block of memory locations corresponding to the target address.

Further aspects, features and advantages of the present technique will be apparent from the following description of examples, which is to be read in conjunction with the accompanying drawings.

DESCRIPTION OF EXAMPLES

Figure 1:
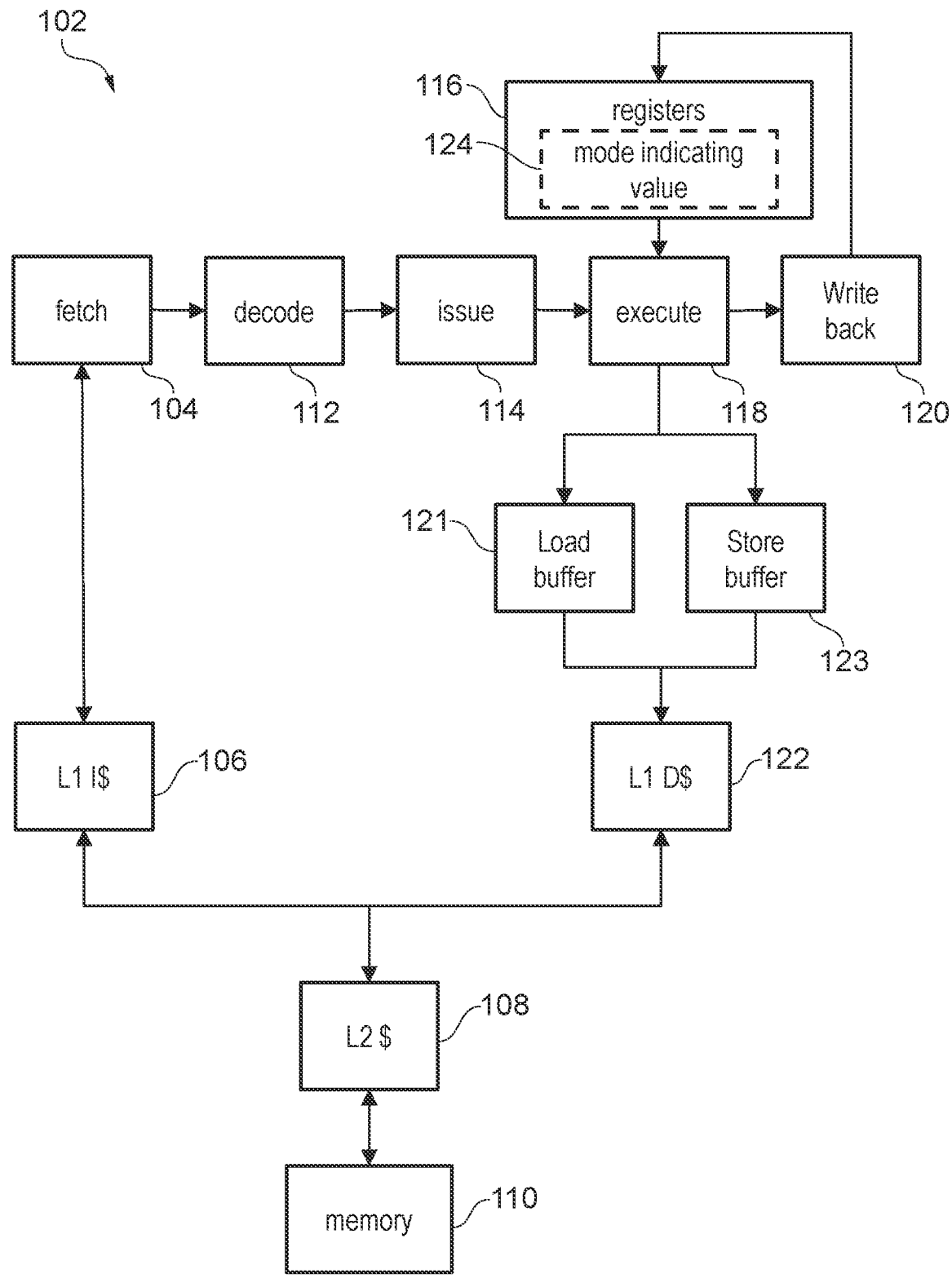
FIG. 1 schematically illustrates an example of a data processing system.

As discussed above, there can be a large overhead when copying data from one location in memory to another, for example in response to a function such as the memcpy( ) function in C. Although memcpy( ) and similar functions may be relatively easy for a programmer to implement when writing high level code (e.g. in a programming language such as C), they can be significantly more difficult to implement in the compiled machine code seen by the instruction decoder of a processor. This can be for a number of reasons; for example, many processors use a load/store architecture, in which instructions do not generally copy data from memory to memory. Operations in a processor with load/store architecture are generally register-to-register instructions, with the exception of load and store instructions which can load data from memory to a register and store data from a register to memory respectively. Therefore, implementation of a function such as memcpy( ) in machine code for a load/store architecture would require separate operations to load data from a source memory location to one or more registers and store data from the one or more registers to a destination memory location (e.g. separate load and store operations). The size of the registers in the data processing system using a load/store architecture therefore places a limit on the number of bytes that can be copied at a time, potentially requiring multiple iterations of a load/store loop. However, there may be multiple register sizes available to the processor which could be used, and which register size is best to use may depend—for example—on the total number of bytes to copy.

Accordingly, decisions on the how to efficiently implement functions such as memcpy( ) may depend on various parameters, such as the total number of bytes to copy, and the alignment of the copy start address relative to an address alignment boundary. In practice, this may mean that a compiled code section implementing a function such as memcpy( ) may start with a set of instructions implementing a "decision tree" for analysing this information (e.g. the above parameters) and deciding on an efficient approach to copying the data between the specified memory locations. This decision tree may often include many branches which are hard to predict by branch predictors (as they are data dependent, e.g. with the branch outcome depending on the particular parameters of the current memcpy( ) operation and varying from one instance of calling the memcpy( ) function to another), so can cause both a high degree in variability in performance and slow performance on average. In particular, the execution of such a large number of branches can lead to a significant overhead in terms of the processing power and resources needed to execute a large number of branch instructions, and because the large number of instructions that need to be executed require a comparatively large instruction cache footprint.

Also, the most efficient way to handle a given memcpy( ) operation may depend on the micro-architecture of the data processing system, which can be difficult and/or slow to assess in software. Including micro-architecture-specific instruction sequences in software may prevent the same code being applicable to different platforms (e.g. with different micro-architectures), so that implementation of the memcpy( ) function may require significant development effort to support.

The above issues do not only apply to the memcpy( ) function in C, but in fact can apply to any function in high-level code for copying data from one location in memory to another or comparing strings or other chunks of data in two different memory locations. For example, the above issues may also apply to other functions such as strcpy( ) in C. Moreover, the above issues do not only apply to functions written in C. Indeed, these issues apply to any equivalent or similar functions in other programming languages too.

In consideration of the above issues, it would therefore be advantageous to be able to reduce the number of instructions that are needed to copy data from one location in memory to another.

The present technique provides an apparatus comprising decode circuitry to decode instructions and processing circuitry responsive to the decoded instructions to perform data processing. In some particular examples, the decode circuitry may decode the instructions to generate control signals, which control the processing circuitry to perform the data processing.

In accordance with the present technique, a memory copy size determining instruction is defined, which specifies as operands a source memory address and a destination memory address. The source memory address indicates a source block of memory locations from which data is to be copied, and the destination memory address indicates a destination block of memory locations to which the data is to be copied. The memory copy size determining instruction also specifies a total number of bytes that are to be copied from the source block of memory locations to the destination block of memory locations. The total number of bytes to be copied may be identified directly in the instruction, for example, or may be identified indirectly using registers referenced by the instruction. It will be appreciated that the number of bytes which can be specified as the total number of bytes to be copied is not particularly limited, and could in some examples be zero. The total number of bytes to be copied may be represented using an encoding which supports at least two different encodings for indicating two or more different non-zero numbers of bytes, and (optionally) also supports an encoding which indicates that the total number of bytes to transfer is zero. This can be particularly useful in improving code density by not needing specific (additional) instructions to be executed ahead of the memory copy size determining instruction to check for the zero-bytes case.

When the memory copy size determining instruction is decoded by the decode circuitry, the processing circuitry is configured to determine a memory copy size indicating value indicative of a subset of the total number of bytes to be copied. The processing circuitry determines the memory copy size indicating value based on at least one of the source memory address and the destination memory address specified by the memory copy size determining instruction. The memory copy size indicating value may indicate the subset as, for example, a number of bytes in the subset, or as a range of memory addresses identifying the bytes in the subset.

In load/store architectures, it can be unusual to provide a single instruction that takes as operands both source and destination memory addresses, given that loads and stores are generally memory-to-register or register-to-memory operations, not memory-to-memory. Thus, the memory copy size indicating instruction of the present technique may seem counterintuitive. However, the inventor realised that, by providing a dedicated memory copy size determining instruction for calculating a subset of the total number of bytes to be copied, the number of instructions needed to determine how many bytes to copy can be significantly reduced. In particular, providing a dedicated instruction in hardware for calculating the memory copy size indicating value allows the memory copy size indicating value to be determined by the processing circuitry based on the specific micro-architectural hardware constraints of the system, thus avoiding the need to implement an extensive software-implemented decision tree in machine code to implement a memcpy( ) function or similar. This allows the memory copy size to be determined without requiring a large number of branch instructions to be executed, which significantly reduces the overhead required to determine the number of bytes to copy, thus reducing the power consumption and, accordingly, increasing the efficiency of the system. Moreover, providing a dedicated instruction for calculating the memory copy size means that the machine code for implementing a function such as a memcpy( ) function does not need to be micro-architecture dependent—instead the architectural instruction for the memory copy size determining instruction may be the same regardless of the particular system micro-architecture, but different micro-architectural implementations may respond to that instruction in different ways to account for their specific micro-architectural constraints. Accordingly, significantly less development effort is needed to develop compilers for compiling software supporting the memcpy( ) or similar function on different platforms.

An example of a restriction on the number of bytes which can be read from or written to memory in a single memory access relates to memory alignment conditions. In some data processing systems, the memory may be considered (logically) to be divided into blocks of data having a uniform size (often referred to as memory words), each beginning at an aligned address. The aligned addresses define alignment boundaries. At least some of the hardware provided for accessing memory may be restricted to accessing, in response to a single request, a single block (word) of data (e.g. between consecutive alignment boundaries). Multiple memory accesses may therefore be needed to access data spanning two or more words. For example, in a data processing system with 16-byte alignment, each word is 16-bytes long and starts at an aligned address which is a multiple of 16; each memory access therefore loads or stores a single 16-byte word. Hence, a request to load a 16-byte chunk of data starting at an unaligned address may be less efficient in terms of performance than a request to load a 16-byte chunk of data starting at an aligned address, as the unaligned access may need to be split into separate aligned accesses.

Therefore, in some examples, the processing circuitry is configured to determine the memory copy size indicating value based on a position of an alignment boundary (e.g. a boundary separating blocks of data which cannot be accessed with a single memory access) relative to at least one of the source memory address and the destination memory address. In this way, memory alignment conditions in the source or destination memory locations can be taken into account through the use of the dedicated memory copy size determining instruction, without the increased overhead associated with executing a number of branch instructions in a sequence of code for analysing the relative offset between the source/destination memory address and an alignment boundary. It will be appreciated that the alignment boundary is not necessarily indicated physically in the memory system, but could instead be identified based on the number of bytes that can be accessed in a single access (for example, if this number is 8 bytes, the alignment boundaries may be every 8 bytes).

In data processing systems subject to memory alignment conditions, efficiency may be improved by issuing aligned load and/or store instructions, which specify aligned addresses, since this minimises the number of memory accesses that need to be carried out to execute the load or store.

Therefore, in some examples of the present technique, the processing circuitry is configured to determine the memory copy size indicating value to specify a number of bytes in the subset corresponding to a difference between an address aligned to said alignment boundary and one of the source memory address and the destination memory address.

In this way, the efficiency of the apparatus can be improved by determining a memory copy size indicating value which allows loads or stores associated with the memory copy operation to be aligned. Moreover, the memory copy size determining instruction may, in some examples, be executed as part of a loop of instructions, where each iteration copies a respective portion of the total number of bytes to be copied. Therefore, in a case where the initial source or destination address is unaligned, this approach allows the source or destination address for the next iteration of the loop to be aligned. Furthermore, providing a dedicated instruction for performing this determination makes this improvement in efficiency possible, by significantly reducing the number of instructions that need to be executed to determine the memory copy size indicating value (as discussed above).

Whether the processing circuitry determines the memory copy size indicating value based on the difference between the address aligned to said alignment boundary (e.g. aligned address) and the source memory address or between the aligned address and the destination memory address may, in some examples, depend on whether load alignment (e.g. where alignment for loads/reads is prioritised) or store alignment (e.g. where alignment for stores/writes is prioritised) is preferred in the apparatus. In particular, when load alignment is preferred, the memory copy size indicating value may be determined based on the difference between the aligned address and the source memory address. Conversely, when store alignment is preferred, the memory copy size indicating value may be determined based on the difference between the aligned address and the destination memory address.

In this way, execution of the memory copy size determining value may be tailored to take into account the specific hardware constraints and requirements of the system (e.g. whether load or store alignment is preferred), or preferences of a programmer.

In some particular examples, whether load or store alignment is preferred is fixed in hardware. In this way, the memory copy size indicating value can be determined in dependence on specific hardware constraints and requirements of the system, allowing for a greater improvement in efficiency.

Alternatively, the processing circuitry may be configured to receive an indication of whether load alignment or store alignment is preferred. The processing circuitry can then determine the memory copy size indicating value based on the indication. The indication of whether load alignment or store alignment is preferred may be a value stored in a register, or a flag set to a particular value, for example. The indication may identify load alignment as preferred or store alignment as preferred, or it may indicate that neither load alignment or store alignment is preferred (in which case, whether load or store alignment is preferred may be selected in dependence on micro-architectural considerations), for example. This approach can be particularly advantageous since it does not require encoding space in the memory copy size determining instruction to be taken up to indicate whether load alignment or store alignment is preferred.

In some examples, the apparatus includes a plurality of registers, and the processing circuitry is responsive to the decode circuitry decoding the memory copy size determining instruction to read the indication of whether load alignment or store alignment is preferred from at least one of the plurality of registers. For example, this could allow a "mode" or "status" value in a control register to be configurable by privileged code to indicate whether memory copy size determining operations should prioritise load or store alignment.

In some examples, the indication of whether load alignment or store alignment is preferred is configurable. In this way, the memory copy size indicating value can be determined in consideration of preferences of a programmer, improving flexibility and allowing the apparatus to be more easily tailored to the needs of the programmer.

In some examples of the present technique, the memory copy size indicating value is determined such that it indicates a number of bytes in the subset of the total number of bytes to be copied that is less than or equal to (e.g. no greater than) the number of bytes that can be copied in a single data transfer (e.g. a single load or store). In this way, the code may be prevented from over-copying beyond the end of the region to be copied.

In some examples, where the apparatus comprises a plurality of registers, the processing circuitry is configured to write the memory copy size indicating value (once it has been determined) to at least one of the plurality of registers. The at least one of the plurality of registers may, for example, be a general purpose register. In this way, the memory copy size indication value can be made available to subsequent instructions, which could (for example) then load/store the subset of the total number of bytes—based on the memory copy size indicating value—from the source block of memory locations to the destination block of memory locations.

In some examples, the apparatus comprises a plurality of registers, and the processing circuitry is responsive to the decode circuitry decoding a data transfer instruction specifying a target memory address and a data transfer size indicating value indicating a number of bytes, to transfer the number of bytes specified by the data transfer size indicating value between the plurality of registers and a target block of memory locations corresponding to the target address. For example, the data transfer instruction could be a load-indirect instruction, and the processing circuitry may be responsive to the decode circuitry decoding the load-indirect instruction to transfer the number of bytes specified by the data transfer size from the target block of memory locations to the plurality of registers. In another example, the data transfer instruction may be a store-indirect instruction, and the processing circuitry may be responsive to the decode circuitry decoding the store-indirect instruction to transfer the number of bytes specified by the data transfer size from the plurality of registers to the target block of memory locations.

In this way, data transfer instructions can be used in a loop of instructions, together with the memory copy size determining instruction, to implement a memory copy function.

If the data transfer instruction is executed after the memory copy size determining instruction, the target memory address may be the source memory address (e.g. for a load-indirect instruction) or the destination memory address (e.g. for a store-indirect instruction) specified in the memory copy size determining instruction, and the data transfer size indicating value may be the memory copy size indicating value determined in response to the memory copy size determining instruction. However, it will be appreciated that whether or not the data transfer instruction does in fact follow the size determining instruction depends on the specific software executed, and is thus not a feature of the hardware apparatus itself. For example, software could find another use for the data transfer instruction of the present technique and use it independently of the memory size determining instruction.

It will also be appreciated that the data transfer instruction may be provided independently of the memory copy size determining instruction; for example, a data processing apparatus may be configured to support the data transfer instruction without necessarily being able to support the memory copy size determining instruction.

In some examples, the processing circuitry is responsive to the decode circuitry decoding the data transfer instruction to increment the target memory address by a value corresponding to the number of bytes specified by the data transfer size indicating value. This avoids the need for a separate add instruction to increment the address based on the accessed number of bytes, hence improving performance and reducing code size. This may be particularly useful when the data transfer instruction is one of a plurality of instructions to be executed to transfer a total number of bytes larger than the number of bytes specified by the data transfer size indicating value between memory and the plurality of registers. In particular, incrementing the target memory address in this way allows a subsequent data transfer instruction to be executed to transfer the next subset of bytes (e.g. consecutive bytes in memory) between the memory and the registers.

In some examples, an encoding of the data transfer size indicating value is capable of specifying the number of bytes as a number of bytes other than a power of 2. This is counter-intuitive, because data processing instructions typically operate on data values made up of a number of bytes equal to a power of 2 (e.g. $2=2^1$, $4=2^2$, $8=2^3$, $16=2^4$, etc.). For example, data transfer instructions do not typically specify a number of bytes to be transferred that is not a power of 2. However, the inventor realised that allowing any number of bytes to be indicated by the data transfer size indicating value has the advantage of making it easier to align memory accesses to, for example, alignment boundaries. For example, if the data transfer instruction is executed as part of a loop of instructions, each iteration transferring a successive block of data between the target memory address and the plurality of registers, then allowing the data transfer size indicating value to specify any number of bytes may allow the next access in the next iteration to be aligned. The data transfer size indicating value may be specified in a source register specified by the data transfer instruction, rather than encoding the size directly in the instruction encoding.

In some examples, the processing circuitry is configured to determine the memory copy size indicating value based on a utilisation amount of at least one processing resource accessible to the processing circuitry. A dynamic approach to determining the memory copy size indicating value such as this may allow for even greater performance improvements, by taking into account the impact of other processes on memory accesses.

In one particular example, the at least one processing resource described above comprises at least one of a load buffer and a store buffer. A load buffer may be a buffer storing access requests which have been issued by the processing circuitry to load data from memory, until the loads can be carried out. For example, loads may be issued before the associated memory address has been computed, and held in the load buffer until the memory address is ready. Similarly, the store buffer may be a buffer storing access requests issued by the processing circuitry to store data to memory, until the stores can be executed. For example, stores may be issued before the associated memory address and/or data are ready, and held in the store buffer until both the memory address and data are ready. In addition, stores may be issued to the store buffer before the instructions have been committed (e.g. in an out-of-order processor), and held in the store buffer until the instruction has been committed.

Determining the memory copy size indicating value based on a utilisation amount of a load or store buffer may allow the apparatus to take into account the effect of other, already issued, memory access requests on the memory system. For example, the memory copy size indicating value may be determined in consideration of the remaining capacity of each of the load and store buffers, so as to prioritise alignment of the one of loads and stores for which buffer utilisation is more tightly constrained.

In some examples, the processing circuitry is responsive to the decode circuitry decoding the memory copy size determining instruction to decrement the total number of bytes to be copied by the number of bytes in the subset (e.g. to subtract the number of bytes in the subset from the total number of bytes, and update the total number of bytes to be the calculated value). By also updating the total number of bytes when executing the memory copy size determining instruction, this avoids the need for an extra subtract instruction to be provided, thus reducing code size and improving performance. For example, if the memory copy size determining instruction is executed as part of a loop of instructions to transfer successive blocks of data between memory locations, even though the updated total number of bytes will not be need by other instructions within the same iteration of the loop, it can be used by the next iteration, without the need for an extra subtract instruction to be executed as part of each iteration.

It should be appreciated, however, that this feature of the memory copy size determining instruction also updating the total number of bytes to be copied is not essential, and other approaches may enable the micro-architectural implementation of the memory copy size determining instruction to be simplified by not updating the total number of bytes in response to execution of the memory copy size determining instruction. For example, this can make the micro-architectural implementation simpler by avoiding the need for two destination registers to be updated in response to the same instruction (e.g. one register to hold the memory copy size indicating value and one register to hold the updated total number of bytes). Moreover, even if the processing circuitry is configured to also update the total number of bytes in response to the memory copy size determining instruction, some micro-architectures may implement the subtraction by splitting the memory copy size determining instruction at the decode stage of a pipeline into separate size determining and subtraction micro-operations which are scheduled independently at an execute stage of the pipeline.

In some examples, the processing circuitry is responsive to the decode circuitry decoding the memory copy size determining instruction to begin a prefetch operation to prefetch data into at least one cache from a memory location determined based on the source memory address and the total number of bytes to be copied. In this way, the performance of a memory copy operation can be improved by making some or all of the bytes that are to be copied available in the at least one cache in advance of executing any load instructions to access those bytes. It should be noted that this would not be possible in an implementation using a software decision tree to decide the size of the subset of the total number of bytes to be copied, as the software decision tree would use generic branch and/or arithmetic/logic unit (ALU) instructions that could also be used for many other purposes. The encoding of an instruction which explicitly identifies a total number of bytes to be loaded (even though only a subset of the total number is determined as being copied next) provides a hint as to how far ahead a prefetch operation can look ahead of the current source memory address, which would not otherwise be available. Therefore, this hint provided by the memory copy size determining instruction can be exploited to (optionally—depending on the micro-architecture) perform prefetching.

Prefetching of data in this way can be particularly advantageous when the total number of bytes to be copied is large—this is because, if the total number of bytes to be copied is small, the prefetched data would be less likely to reach the cache before the corresponding load is encountered. Therefore, it may be more advantageous to prioritise prefetches which are sufficiently far away that the data has a chance of being returned to the cache before the corresponding iteration of the loop that will request loading of that prefetched data is encountered. Therefore, in some examples, the prefetch operation comprises comparing the total number of bytes to be copied with a threshold value, and prefetching the data when the total number of bytes exceeds the threshold value. However, it will be noted that this is just one example of a criterion for deciding whether to perform the prefetch operation; in some examples other criteria may be used, or prefetching may always be carried out or may not be carried out at all.

The techniques discussed above can be implemented in a hardware apparatus which has circuit hardware implementing the processing circuitry and decode circuitry described above, which support the memory copy size determining instruction as part of the native instructions set architecture supported by the decode circuitry and processing circuitry.

However, in another example the same techniques may be implemented in a computer program (e.g. an architecture simulator or model) which may be provided for controlling a host data processing apparatus to provide an instruction execution environment for execution of instructions from target code. The computer program may include instruction decoding program logic for decoding instructions of the target code so as to control a host data processing apparatus to perform data processing. Hence, the instruction decoding program logic emulates the functionality of the instruction decoder of a hardware apparatus as discussed above. Also, the program may include register maintenance program logic which maintains a data structure (within the memory or architectural registers of the host apparatus) which represents (emulates) the architectural registers of the instruction set architecture being simulated by the program. The emulated registers may include any of the plurality of registers described in some examples above. The instruction decoding program logic includes support for the memory copy size determining instruction (and optionally also for the data transfer instruction) which has the same functionality as described above for the hardware example. Hence, such a simulator computer program may present, to target code executing on the simulator computer program, a similar instruction execution environment to that which would be provided by an actual hardware apparatus capable of directly executing the target instruction set, even though there may not be any actual hardware providing these features in the host computer which is executing the simulator program. This can be useful for executing code written for one instruction set architecture on a host platform which does not actually support that architecture. Also, the simulator can be useful during development of software for a new version of an instruction set architecture while software development is being performed in parallel with development of hardware devices supporting the new architecture. This can allow software to be developed and tested on the simulator so that software development can start before the hardware devices supporting the new architecture are available.

As noted above, the data transfer instruction may be provided independently of the memory copy size determining instruction, and may be supported in a data processing system which does not necessarily also support the memory copy size determining instruction. Accordingly, an apparatus may be provided with decode circuitry configured to decode instructions, processing circuitry responsive to the instructions decoded by the decode circuitry to perform data processing, and a plurality of registers. In this example, a data transfer instruction is defined, which specifies a target memory address and a given general purpose register of the plurality of registers. The processing circuitry is responsive to the decode circuitry decoding the data transfer instruction to transfer data (whose size corresponds to a number of bytes specified by a data transfer size indicating value held in the given general purpose register) between the at least one of the plurality of registers and a target block of memory locations corresponding to the target address. A general purpose register (GPR) may be a register capable of holding generic data values which have a meaning not explicitly defined in an instruction set architecture. For example, GPRs may hold data and/or addresses. A GPR may be referenced as a source operand in an arithmetic/logical instruction or as an operand for generating an address for a load/store instruction. The instruction which uses the value in the GPR as a source operand may have an encoding which includes a multi-bit register specifier field which selects which of a plurality of GPRs is to be used to provide the source operand. In contrast, a special purpose register (SPR) may be a register designated for holding a data value which has a special defined meaning defined in the instruction set architecture, and which generally cannot be referenced as a GPR in a general-purpose register specifier field of an arithmetic/logical or load/store instruction. For example, an SPR (also referred to as a control register or system register) may hold a control value for use in a specific control or data handling task (e.g. defining a mode indicating value indicating a current operating mode, exception handling information for handling exceptions, status flags indicating the outcome of processing which can be tested by conditional instructions, etc.). Unlike general purpose registers, special purpose registers cannot typically by referenced as operands in arithmetic instructions or address calculation operations. Instead, special purpose registers might be referenced by the processing circuitry implicitly for certain operations, rather than being designated by an explicit register field in the encoding of an instruction. Also, there may only be a limited number of special instructions which may read or write special purpose registers, which may generally be distinct from arithmetic/logical or load/store instructions and could in some cases be restricted for execution in an operating state associated with a given level of privilege or higher.

By providing a data transfer instruction for transferring a number of bytes specified in a general purpose register instead of a special purpose register, the versatility of the system can be improved and in practice code density of software executing on the system can be improved. As the instructions which can manipulate the contents of SPRs may be limited, if the data transfer instruction referenced an SPR then additional instructions to move data between the SPR and a GPR would be needed to allow other instructions to set or respond to the data transfer size indicating value as desired. By using a GPR to indicate the data transfer size indicating value, the need for such move instructions can be avoided as the GPR can be the destination register of the memory copy size determining instruction described above and can also be referenced as a source register by general purpose arithmetic instructions or other instructions. For example, calculations of memory addresses (e.g. where a memory address may be incremented between loads corresponding to different iterations of a memory copy loop) and other calculations (e.g. in a loop comprising the above-described memory copy size determining instruction, the total number of bytes to be copied may be decremented after each execution of the loop) may be better supported when the operands for the data transfer instruction are specified in general purpose registers which can be referenced as operands in arithmetic and address calculating operations. If these operands were, instead, in special purpose registers, then additional move instructions could be required.

Also, by using a GPR to provide the data transfer size indicating value, this may allow different instances of the data transfer size indicating value to reference different GPRs, which can provide greater flexibility e.g. for supporting accesses or copies involving multiple different data structures to be copied within the same loop iteration, or for better support loop unrolling (loop unwinding), where the instructions for multiple iterations of a high-level loop of operations are compiled explicitly one after the other, so that each iteration of the compiled loop comprises executing multiple occurrences of the loop. Loop unrolling can be more efficient in some cases if the instructions corresponding to different instances of the high-level loop (that are combined within the same compiled loop iteration) can reference different registers for their operands, which can be more straightforward if GPRs are used to provide the operands.

The processing circuitry may interpret the data transfer instruction as a no-operation (NOP) instruction when the data transfer size indicating value indicates the number of bytes to be zero.

Particular embodiments will now be described with reference to the figures.

FIG. 1 schematically illustrates an example of a data processing apparatus 102 having a processing pipeline comprising a number of pipeline stages. The pipeline includes a fetch unit 104, which fetches instructions from the level one instruction cache 106 or other memory structures such as the level two cache 108 or the main memory 110. The fetch stage (fetch circuitry) 104 fetches instructions identified by fetch addresses, and a decode stage (decode circuitry or instruction decoder) 112 decodes the fetched instructions to generate control information (e.g. control signals) for controlling the subsequent stages of the pipeline (including the processing circuitry 118). Therefore, the decode stage 112 is an example of decode circuitry configured to decode instructions.

An issue stage 114 includes an issue queue which queues instructions awaiting execution until the required operands for processing those instructions are available in the registers 116, and selection circuitry to select instructions for execution by the execute stage 118. The execute stage 118 executes the instructions to carry out corresponding processing operations, under the control of the control signals generated by the decode stage 112, and a writeback stage 120 writes results of the executed instructions back to the registers 116. The execute stage 118 is an example of processing circuitry responsive to the instructions decoded by the decode circuitry to perform data processing.

The execute stage 118 may include a number of execution units such as an ALU (arithmetic logic unit) for performing arithmetic or logical operations, a floating-point unit for performing operations using floating-point operands and a load/store unit for performing load operations to load data from a memory system to the registers 116 or store operations to store data from the registers 116 to the memory system. In this example the memory system includes the level one instruction cache 106, a level one data cache 122, the level two cache 108 which is shared between data and instructions, and the main memory 110, but it will be appreciated that this is just one example of a possible memory hierarchy and other implementations can have further levels of cache or a different arrangement. Access to memory may be controlled using a memory management unit (MMU—not shown) for controlling address translation and/or memory protection. Requests to load data from memory may be buffered in a load buffer 121, for example while their associated memory addresses are computed. Similarly, a store buffer 123 is also provided, for buffering requests to write data to memory until their associated memory addresses and data are available. In an out-of-order processor, the store buffer 123 may also be arranged to hold store requests—even once their associated address and data are ready—until they are committed. Address comparisons may be performed between requests buffered in the load/store buffers 121, 123, e.g. to detect and resolve read-after-read, read-after-write or write-after-write hazards, and enable performance improvements such as merging multiple pending stores to the same address, or forwarding store data awaiting writing to the memory system in response to a pending store request as a load value to be returned in response to a load address targeting the same address as the pending store request.

It will be appreciated that the pipeline shown in FIG. 1 is just one example and other examples may have different sets of pipeline stages or execution units. For example, an out-of-order processor may include a rename stage which performs register renaming to map architectural register specifiers identified by the instructions to physical register specifiers identifying registers 116 provided in hardware. A data processing system may also optionally include a branch predictor to predict the outcome of branch instructions and cause the fetch circuitry 104 to fetch instructions according to the predicted outcomes.

Also shown in FIG. 1 is a mode indicating value register 124, holding a mode indicating value which can be used during execution of a memory copy size determining instruction as discussed below. For example, the mode indicating value may be indicate criteria for determining a memory copy size indicating value, such as whether load or store alignment is preferred.

Figure 2:
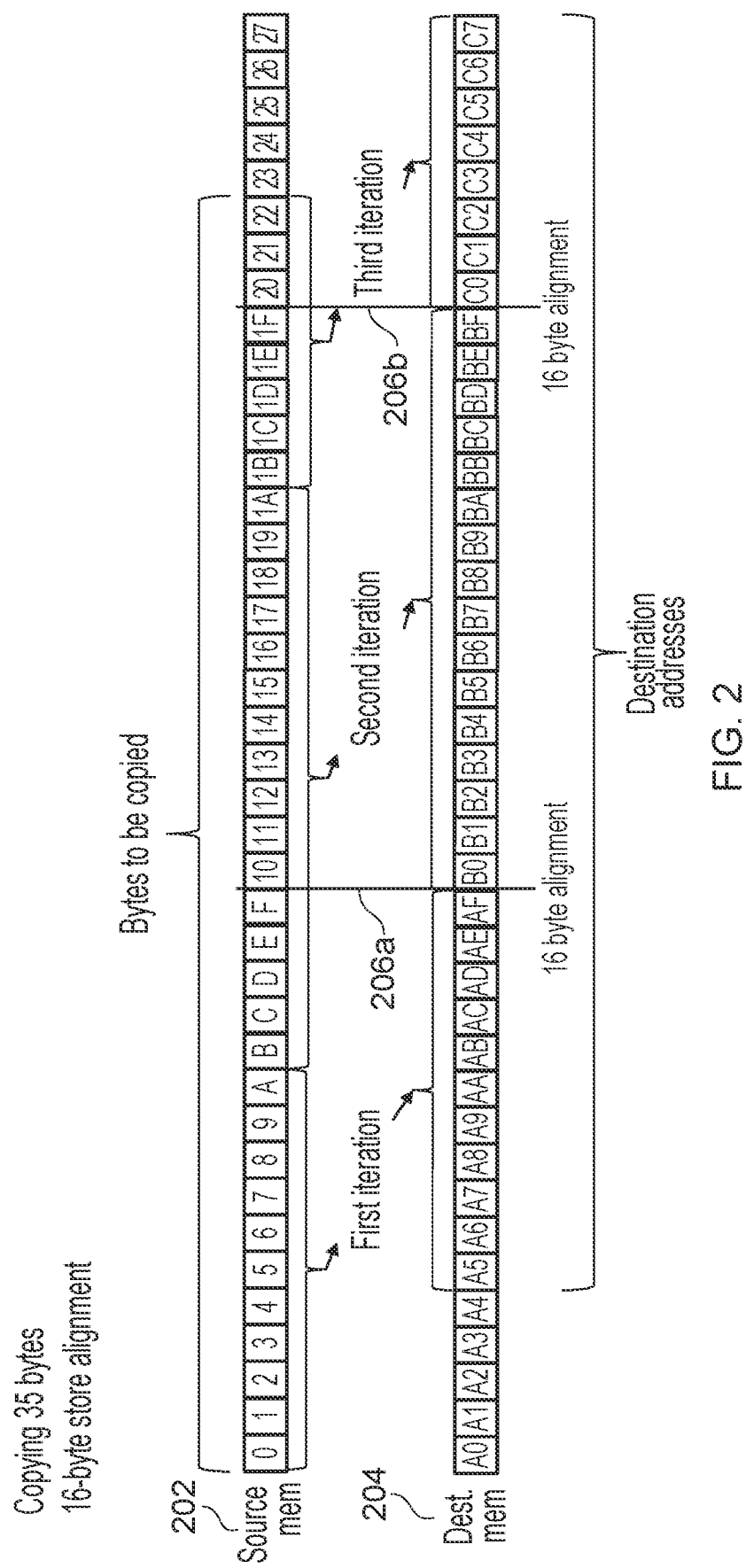
FIG. 2 schematically illustrates an example of a store-aligned memory copy operation.

The instructions fetched by the fetch stage 104 may be determined by a compiler, which identifies the program instructions that need to be executed to perform certain functions specified by a programmer—e.g. by translating source code written by a programmer into executable code comprising instructions which can be executed by the execute stage 118. For example, the compiler may be a just-in-time compiler executed in software on the same processor, or could be executed offline on a different apparatus with the resulting compiled code being read into memory from a storage device. An example of a function that could be specified in the source code is a memory copy, or memcpy( ) function, which may be translated by the compiler into a series of instructions for copying copy data values from one part of the main memory 110 to another part of the main memory. For example, as shown in FIG. 2, a programmer may wish to copy data stored in a source block of memory locations 202 to a destination block of memory locations 204. In particular, FIG. 2 illustrates an example in which 35 bytes of data, stored in the memory source locations identified by the addresses 0x0 to 0x22, are to be copied to the destination memory locations identified by the addresses 0xA5 to 0xC7. In this example, the memory is arranged to store data in units of bytes, and is subject to 16-byte alignment. Accordingly, each individual access (load or store) to data stored in the memory is only permitted to access a single 16-byte memory word, as defined by alignment boundaries 206a, 206b every 16 bytes. It should be noted that the alignment boundaries 206 in memory are not typically physical boundaries in memory; instead, the alignment boundaries 106 are typically identified based on their addresses. For example, for 16-byte alignment, the alignment boundaries are expected to be at memory locations identified by aligned memory addresses which are a multiples of 16—e.g. 0x10, 0x20, 0xB0, 0xC0. Accordingly, each access to memory is aligned to an aligned address, and accesses no more than 16 bytes at a time.

In some cases, one of load alignment—where alignment of load instructions is prioritised—or store alignment—where alignment of store instructions is prioritised—is preferred. This preference may be fixed for a given data processing apparatus, and may for example depend on the capacity of load and store buffers in the system. Alternatively, this preference may be determined dynamically—for example, in response to current utilisation of processing resources such as the load and store buffers—or it might be configurable. For example, whether load or store alignment is preferred may be indicated using a mode indicating value stored in a mode indicating value register, as discussed above with respect to FIG. 1.

Returning to FIG. 2, since the number of bytes to be copied (35) is larger than the memory word size (16), the process of copying the identified bytes between the source memory location 202 and the destination memory location 204 cannot be carried out using a single pair of load and store operations. Thus, the process may be split up into multiple iterations, each iteration starting with a step of determining the number of bytes to copy in that iteration. FIG. 2 illustrates an example where three iterations are carried out to copy the bytes between the memory locations.

In a typical data processing system, the first iteration may be preceded in software by a complicated decision tree to determine the number of bytes to be copied at a time, which may require the execution of a large number of instructions, such as branch instructions. This contributes to a large overhead for typical memory copy functions, since the execution of a large number of instructions may require a significant amount of processing power, and may take up a large amount of space in caches in the system. Moreover, execution of a large number of heavily data-dependent branches further contributes to the large overhead, because such branches are hard to predict, since on different occasions of calling the same memcpy( ) function the total number of bytes to be copied and/or the start address will be different, leading to totally different outcomes in the decision tree. Accordingly, there is a high chance of mispredictions of the branch instructions of the decision tree, leading to a loss of performance. This can be undesirable, since it can negatively impact the performance and efficiency of the system.

Accordingly, it would be desirable to be able to calculate the number of bytes to be copied in each iteration using fewer instructions. In consideration of this, the inventor has proposed a new instruction—the memory copy size determining instruction—dedicated to calculating the number of bytes to be copied in a given iteration of a memory copy process. For example, the complete process of copying the total number of bytes from the source memory locations to the destination memory locations (referred to herein as a memory copy operation) may be executed as an iterative loop of instructions, beginning with the memory copy size determining instruction. The memory copy size determining instruction specifies the source memory address identifying the source block of memory locations (e.g. 0x0 in the example of FIG. 2), the destination memory address identifying the destination block of memory locations (e.g. 0xA5 in the example of FIG. 2), and the total number of bytes to be copied (e.g. 35 in the example of FIG. 2). The processing circuitry (execute stage) is responsive to the decode circuitry (decode stage) decoding the memory copy size determining instruction to determine, based on the source memory address, the destination memory address and the total number of bytes to be copied, a memory copy size indicating value indicating a subset of the total number of bytes that is to be copied in a current iteration of the memory copy operation. For example, in FIG. 2, the subset of bytes to be copied in the first iteration includes the data stored between 0x0 and 0xA.

The memory copy size determining instruction may be implemented in a number of different ways. One example of a memory copy size determining instruction according to the present technique is be represented below, where the memory copy size determining instruction is indicated as "memcpy1X", and identifies as inputs three registers—Xsource, identifying the source memory address, Xdest, identifying the destination memory address, and Xbytes_left, identifying the number of bytes left to copy (e.g. the total number of bytes to be copied)—and identifies as an output register Xbytes, to which the number of bytes to copy this iteration is to be written:

memcpy1X     <Xbytes>,     <Xdest>,     <Xsource>, <Xbytes_left_to_copy>
    input:
        <Xsource>=source memory address
        <Xdest>=destination memory address
        <Xbytes_left >=total bytes left to copy
    output:
        <Xbytes>=number of bytes to copy this iteration A subtract (sub) instruction may then be executed to adjust (decrement) the total number of bytes to copy, by subtracting the number of bytes to copy this iteration from the total number of bytes left to copy:

sub <Xbytes_left>, <Xbytes_left>, <Xbytes>

Once the memory copy size determining instruction and the subtract instruction have been executed, a load-indirect instruction may be issued to load the subset of bytes identified by the memory copy size determining instruction into one or more registers from the source block of memory locations, followed by a store-indirect instruction to store the subset of bytes from the one or more registers to the destination block of memory locations. For example:

load_indirect <Xtemp>, [<Xsource>], <Xbytes>
    input:
        <Xsource>=source memory address
        <Xbytes>=number of bytes to copy this iteration
    output:
        <Xtemp>=temporary register into which the subset is loaded
    store_indirect <Xtemp>, [<Xdest>], <Xbytes>
    input:
        <Xtemp>=temporary register holding the subset
        <Xbytes>=number of bytes to copy this iteration
        <Xdest>=destination memory address Although not shown above, the load-indirect and store indirect instructions may also increment the source and destination addresses respectively by the number of bytes copied in the current iteration. The registers specified by the memory copy size determining instruction, the load indirect instruction and the store indirect instruction in the examples above are all general purpose registers.

The memory copy size determining instruction, the subtraction instruction, the load-indirect instruction and the store-indirect instruction can then be executed together, over multiple iterations, if necessary, as a loop of instructions, to perform a memory copy operation to copy all of the total number of bytes from the source memory location to the destination memory location. This is represented below:

```
// memcpy ( ) implemented using proposed memcpy1X instruction
memcpy (<Xdest>, <Xsource>, <Xbytes_left>):
    mov         <Xdest_temp>, <Xdest>
1:
    memcpy1X    <Xbytes>, <Xdest>, <Xsource>, <Xbytes_left>
    sub         <Xbytes_left>, <Xbytes_left>, <Xbytes>
    load_indirect <Xtemp>, [<Xsource>], <Xbytes>
    store_indirect <Xtemp>, [<Xdest>], <Xbytes>
    cbnz        <Xbytes_left>, 1b
    // conditional branch if not zero (branches to 1 if at least one
    byte left to copy)
    mov         X0, <Xdest_temp> // memcpy returns dest pointer
    ret
```

The memcpy1X instruction above is just one example implementation of the memory copy size determining instruction. In another example, the subtraction operation may be calculated as part of the memory copy size determining operation, executed in response to the memory copy size determining instruction being executed:

```
memcpyl    <Xbytes>, <Xbytes_left>, <Xdest>,
           <Xsource>, <Xbytes_left>
input:
           <Xsource> = source memory address
           <Xdest> = destination memory address
           <Xbytes_left> = total bytes left to copy
output:
           <Xbytes> = number of bytes to copy this iteration
           <Xbytes_left> = total remaining bytes to copy
           after this iteration
```

The memory copy operation can then be implemented as a loop comprising the memcpy1 instruction, as follows:

```
// memcpy( ) implemented using proposed instructions
memcpy (<Xdest>, <Xsource>, <Xbytes_left>):
    mov         <Xdest_temp>, <Xdest>
1:
    memcpy1     <Xbytes>, <Xbytes_left>, <Xdest>, <Xsource>,
    load_indirect <Xtemp>, [<Xsource>], <Xbytes>
    store_indirect <Xtemp>, [<Xdest>], <Xbytes>
    cbnz        <Xbytes_left>, 1b
    mov         X0, <Xdest_temp>
    ret
```

Returning to FIG. 2, the memory copy process illustrated in this example can be implemented according to either of the above examples. For example, using the memcpy1 instruction:

First Iteration:

memcpy1     <Xbytes=11>,     <Xbytes_left=24(output)>, <Xbytes_left=35(input)>,     <Xdest=0xA5>, <Xsource=0> load_indirect <Xtemp>, [<Xsource=0>], <Xbytes=11>
    store_indirect <Xtemp>, [<Xdest=0xA5>], <Xbytes=11>

Second Iteration:
  memcpy1  <Xbytes=16>,  <Xbytes_left=8(output)>,
      <Xbytes_left=24(input)>,  <Xdest=0xB0>,
      <Xsource=0xB>
  load_indirect  <Xtemp>,  [<Xsource=0xB>],
      <Xbytes=16>
  store_indirect <Xtemp>, [<Xdest=0xB0>], <Xbytes=16>
Third Iteration:
  memcpy1  <Xbytes=8>,  <Xbytes_left=0(output)>,
      <Xbytes_left=8(input)>,  <Xdest=0xC0>,
      <Xsource=0x1B>
  load_indirect  <Xtemp>,  [<Xsource=0x1B>],
      <Xbytes=8>
  store_indirect <Xtemp>, [<Xdest=0xC0>], <Xbytes=8>

In this example, store alignment is preferred, so the memory copy size indicating value (Xbytes) for each iteration is calculated so that the address which will become Xdest for the next iteration of the loop is aligned with the alignment boundaries 206 in the destination memory locations. In particular, the memory copy size indicating value (Xbytes) is calculated as the difference between Xdest and the next alignment boundary address.

In the above example, the memory copy size determining instruction corresponds with the "memcpy1" example given above, which calculates the number of bytes left to copy (e.g. decrements the total number of bytes to be copied). However, it should be noted that the above operation could instead be carried out using a combination of the "memcpy1 X" example and a subtract instruction. Also, while the load-indirect and store-indirect instructions in the above examples specify Xn (64-bit) registers, it will be appreciated that this is just an example, and any type of register could be specified. For example, Qn (128-bit) registers could be used instead. Moreover, while the load-indirect and store-indirect instructions in the above examples each specify a single register for holding the subset of bytes copied in the current iteration, it is also possible for the load-indirect and store-indirect instructions to each specify two registers for holding the subset:

```
load_indirect_pair <Xtempt1>, <Xtemp2>, [<Xsource>], <Xbytes>
  address generation and update:
  addr = <Xsource>
  <Xsource> += <Xbytes>
  (<Xtempt1>, <Xtemp2>) = mem[addr], size of <Xbytes>
store_indirect_pair <Xtempt1>, <Xtemp2>, [<Xdest>], <Xbytes>
  address generation and update:
  addr = <Xdest>
  <Xdest> += <Xbytes>
  mem[addr] = (<Xtempt1>, <Xtemp2>), size of <Xbytes>
```

Accordingly, a memcpy2X instruction can be implemented in combination with the load-indirect-pair and store-indirect-pair instructions as follows:

```
// memcpy( ) implemented using proposed memcpy2X instruction
memcpy (<Xdest>, <Xsource>, <Xbytes_left>):
  mov       <Xdest_temp>, <Xdest>
1:
  memcpy2X  <Xbytes>, <Xdest>, <Xsource>, <Xbytes_left>
  sub <Xbytes_left>, <Xbytes_left>, <Xbytes>
  load_indirect_pair <Xtempt1>, <Xtemp2>, [<Xsource>], <Xbytes>
  store_indirect_pair <Xtempt1>, <Xtemp2>, [<Xdest>], <Xbytes>
  cbnz      <Xbytes_left>, 1b
  mov       X0, <Xdest_temp> // memcpy returns dest pointer
  ret
```

Alternatively, using Qn registers instead of Xn registers:

```
// memcpy( ) implemented using proposed memcpy2Q instruction
memcpy (<Xdest>, <Xsource>, <Xbytes_left>):
  mov       <Xdest_temp>, <Xdest>
1:
  memcpy2Q  <Xbytes>, <Xdest>, <Xsource>, <Xbytes_left>
  sub <Xbytes_left>, <Xbytes_left>, <Xbytes>
  load_indirect_pair <Qtemp1>, <Qtemp2>, [<Xsource>], <Xbytes>
  store_indirect_pair <Qtemp1>, <Qtemp2>, [<Xdest>], <Xbytes>
  cbnz      <Xbytes_left>, 1b
  mov       X0, <Xdest_temp> // memcpy returns dest pointer
  ret
```

Thus, there are several ways of implementing the memory copy size determining instruction, load-indirect instruction and store-indirect instruction in a data processing system. All of the above examples of the memory copy size determining instruction identify a source memory address indicative of a source block of memory locations, a destination memory address indicative of a destination block of memory locations, and a total number of bytes to be copied from the source block of destination locations to the destination block of memory locations. In all of the above examples, a memory copy size indicating value, indicative of a subset of the total number of bytes to be copied, is determined in dependence on the source memory address and/or the destination memory address. It will be appreciated that the above examples are not exhaustive, and other approaches to implement these instructions are also possible.

Figure 3:
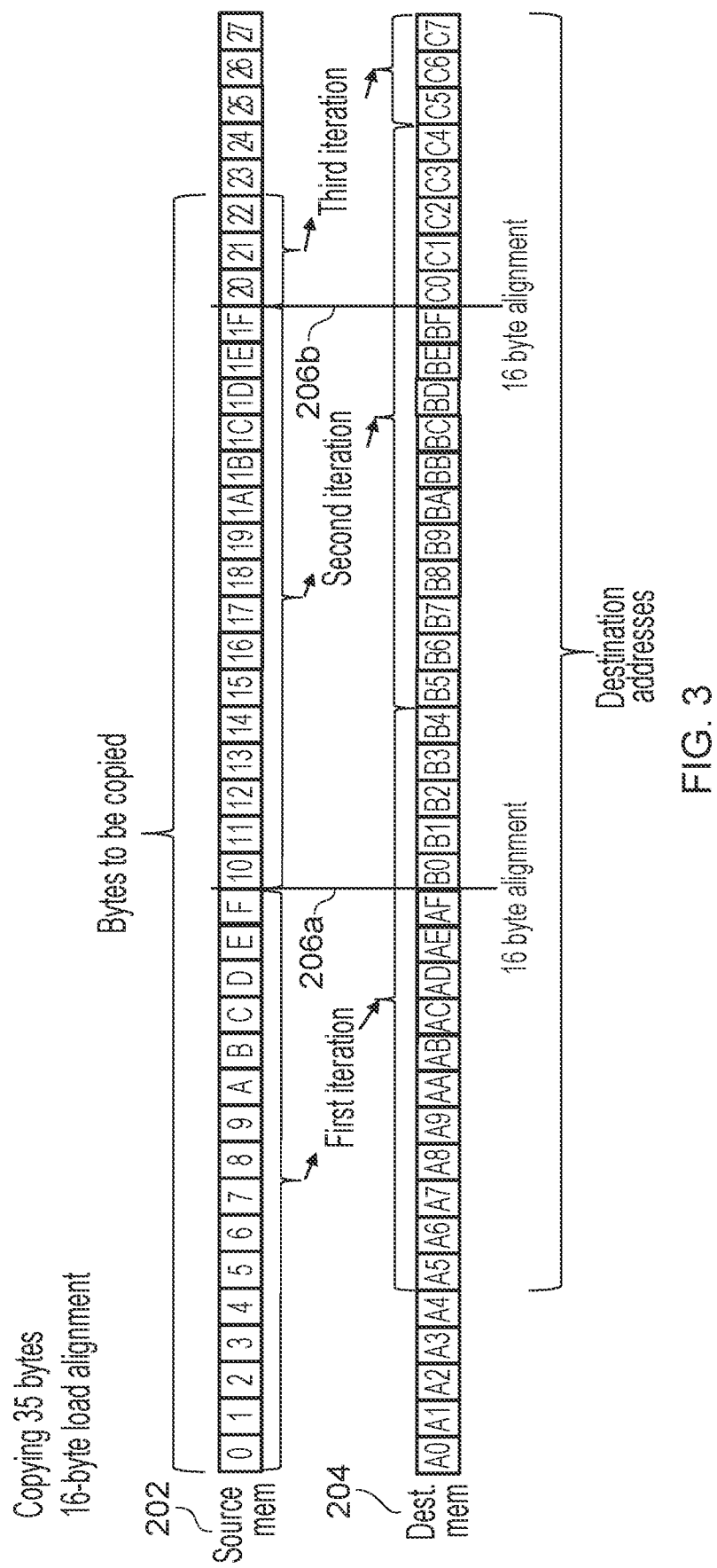
FIG. 3 schematically illustrates an example of a load-aligned memory copy operation.

FIG. 3 shows another example of a memory copy operation to copy 35 bytes from a source memory location 202 to a destination memory location 204. The example shown in FIG. 3 is the same as the example in FIG. 2, except that load alignment is preferred instead of store alignment. Therefore, as in FIG. 2, the memory copy size determining instruction will specify the source memory address 0x0, the destination memory address 0xA5, and the total number of 35 bytes to be copied.

However, since load alignment is preferred in this example instead of store alignment, the memory copy size indicating value (Xbytes) for each iteration is calculated so that the address which will become Xsource in the next iteration is aligned with the alignment boundaries 206 in the source memory location. In particular, the memory copy size indicating value (Xbytes) may be calculated as the difference between Xsource and the next alignment boundary address:

First Iteration:
  memcpy1  <Xbytes=16>,  <Xbytes_left=19(output)>,
      <Xbytes_left=35(input)>,  <Xdest=0xA5>,
      <Xsource=0>
  load_indirect <Xtemp>, [<Xsource=0>], <Xbytes=16>
  store_indirect <Xtemp>, [<Xdest=0xA5>], <Xbytes=16>
Second Iteration:
  memcpy1  <Xbytes=16>,  <Xbytes_left=3(output)>,
      <Xbytes_left=19(input)>,  <Xdest=0x85>,
      <Xsource=0x10>
  load_indirect  <Xtemp>,  [<Xsource=0x10>],
      <Xbytes=16>
  store_indirect <Xtemp>, [<Xdest=0x85>], <Xbytes=16>
Third Iteration:
  memcpy1  <Xbytes=3>,  <Xbytes_left=0(output)>,
      <Xbytes_left=3(input)>,  <Xdest=0xC5>,
      <Xsource=0x20>
  load indirect <Xtemp>, [<Xsource=0x20>], <Xbytes=3>
  store indirect <Xtemp>, [<Xdest=0xC5>], <Xbytes=3>

As with FIG. 2, it will be appreciated that the above series of iterations could equally be carried out using the memcpy1

X, memcpy2X or memcpy2Q examples discussed above. It will also be appreciated, as with FIG. 2, that these example implementations of the memory copy size determining instruction are not exhaustive.

Both examples of FIGS. 2 and 3 achieve the same end result, in that all of the required bytes were copied. However, the different approaches may yield different levels of performance in different circumstances—for example, when being implemented on different micro-architectures, or due to dynamic conditions such as load or store buffer occupancy. In the example of FIG. 3 (prioritising load alignment), each of the unaligned stores may need to be split into two store requests, while the loads can all be handled in one request as the first load only loads part of one word and the other loads are aligned; however, the result will nonetheless be the same as for the example in FIG. 2 (prioritising store alignment).

Whether load alignment or store alignment is preferred may depend on an indication provided in software. Alternatively, whether load or store alignment is preferred may be fixed in hardware. If fixed in hardware, the hardware's decision of whether load or store alignment is preferred may be independent of any indication provided in software, so that the same software code can run on different micro-architectures implemented based on different design choices, leading to different outcomes for the number of bytes determined in the subset (see examples of FIGS. 2 and 3). Instructions giving different functional results for a result value on different micro-architectures is counter-intuitive, since one would expect the code to give exactly the same functional results on each micro-architecture supporting the instruction set architecture (ISA). However, the inventor has recognised that in practice the limitation on the number of bytes that fit in a register means that implementation of a memcpy( ) function may require a loop iterating through the memory region to be copied, and so even if the number of bytes determined by the memory copy size determining instruction in the first iteration differs, the loop can be written so that the end result is the same—the loop as a whole still steps through all the required region to be copied. By giving the micro-architecture the freedom to determine, in hardware, whether load or store alignment is preferred, this helps to support a range of decisions for micro-architecture designers.

Figure 4:
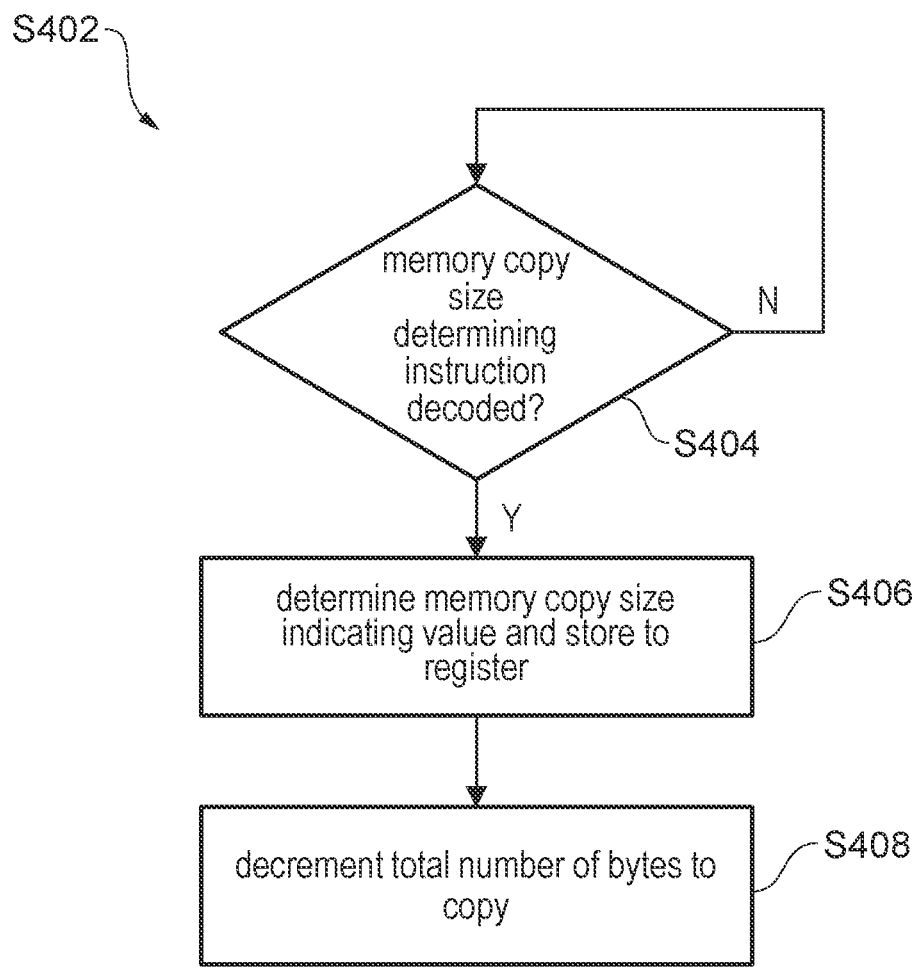
FIG. 4 is a flow diagram illustrating an example of a method of execution of a memory copy size determining instruction.

FIG. 4 is a flow diagram illustrating an example of a method S402 carried out by the processing circuitry to execute a memory copy size determining instruction. The method S402 includes a step S404 of determining whether a memory copy size determining instruction has been decoded by the decode circuitry. For example, the processing circuitry may determine that the memory copy size determining instruction has been decoded in response to receiving control signals from the decode circuitry. The memory copy size determining instruction specifies a source memory address, a destination memory address and a total number of bytes to be copied from a source block of memory locations indicated by the source memory address to a destination block of memory locations indicated by the destination memory address.

When it is determined that a memory copy size determining instruction has been decoded, the processing circuitry determines S406 a memory copy size indicating value indicative of a subset of the total number of bytes to be copied (e.g. the memory copy size indicating value may indicate a subset of bytes that are to be copied in a current iteration of a loop of instructions comprising the memory copy size determining instruction, a load-indirect instruction and a store-indirect instruction) and stores this value to a register.

In the example of FIG. 4, the processing circuitry is also responsive to the memory copy size determining instruction being decoded to decrement S408 the total number of bytes to copy by the number of bytes in the subset, to indicate a number of bytes left to copy (e.g. in subsequent iterations of the loop described above). However, it will be appreciated that (as discussed above) a separate subtraction instruction may instead be provided to decrement the total number of bytes to copy, rather than the processing circuitry performing this step S408 in response to the memory copy size determining instruction being decoded.

Figure 5:
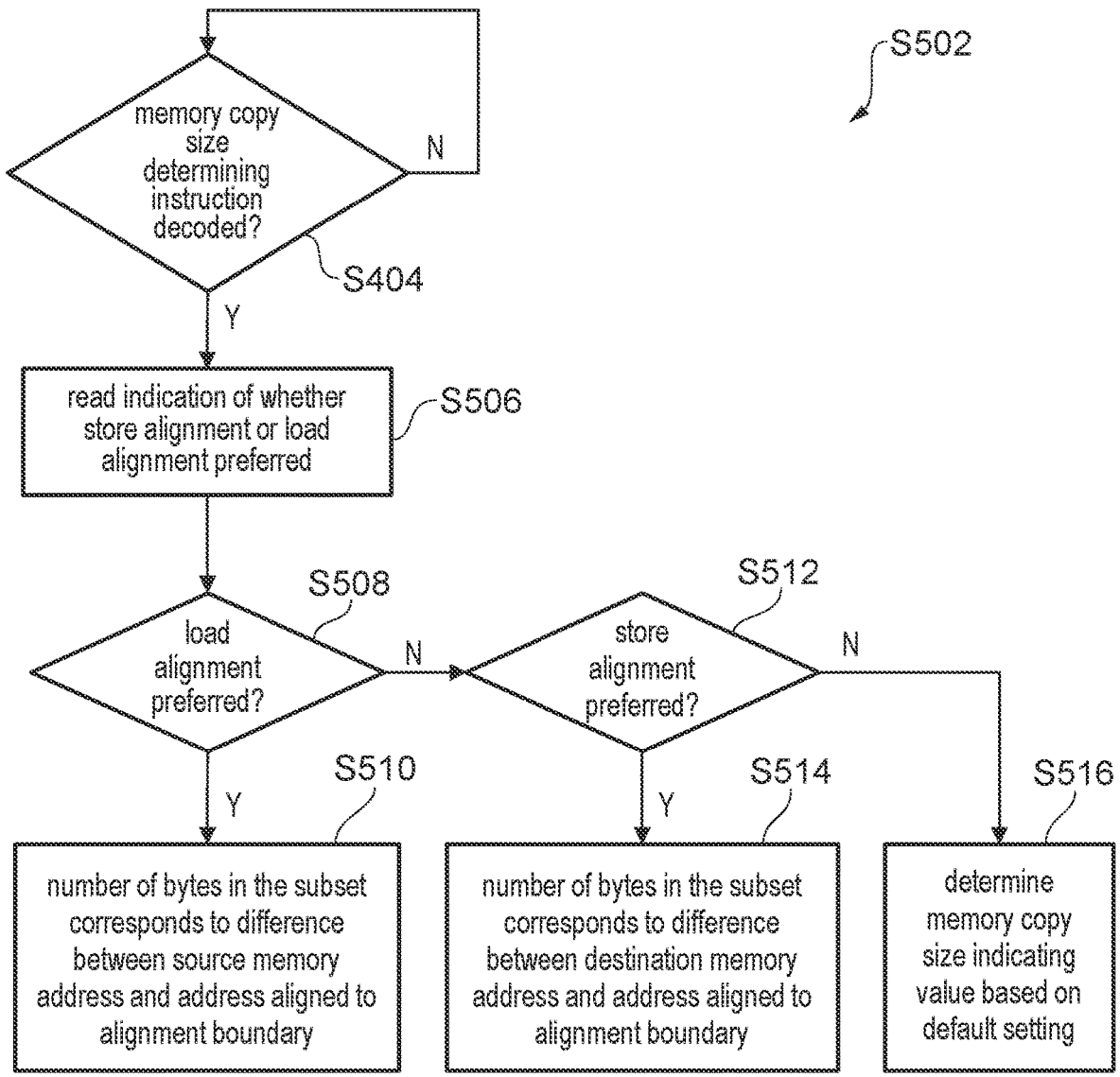
FIG. 5 is a flow diagram illustrating another example of a method of execution of a memory copy size determining instruction.

FIG. 5 shows an example of a method S502 carried out by the processing circuitry to determine the memory copy size indicating value based on an indication of whether store alignment or load alignment is preferred (e.g. a value stored in the mode indicating value register 124 of FIG. 1). As in FIG. 4, the method includes a step S404 of determining whether a memory copy size determining instruction has been decoded. When it is determined that a memory copy size determining instruction has been decoded, the processing circuitry is configured to read S506, from a register, an indication of whether load alignment or store alignment is preferred.

After reading the indication, the processing circuitry determines S508, based on the indication, whether load alignment is preferred. If load alignment is preferred, the processing circuitry determines S510 the memory copy size indicating value such that number of bytes in the subset corresponds to the difference between the source memory address and an address aligned to an alignment boundary.

If load alignment is not preferred, the processing circuitry determines S512 whether store alignment is preferred. If store alignment is preferred, the processing circuitry determines S514 the memory copy size indicating value such that the number of bytes in the subset corresponds to the difference between the destination memory address and an address aligned to an alignment boundary.

On the other hand, if it is determined that neither load alignment nor store alignment is preferred, the processing circuitry is configured to determine S516 the memory copy size indicating value based on a default setting for the data processing apparatus.

Optionally, the processing circuitry may go on to decrement the total number of bytes by the number of bytes in the subset in the subset, as discussed above.

In the approach of FIG. 5, the indication of whether load alignment or store alignment is preferred is configurable (e.g. by updating the value held in the mode indicating vale register described above). This provides additional flexibility to tailor the execution of the memory copy size determining instruction to the specific needs of the programmer and/or the system. However, it will be appreciated that in other examples, whether load or store alignment is preferred is fixed in hardware—in this case, the decision of which of load and store alignment to prioritize may be independent of any indication provided in software.

Figure 6A:
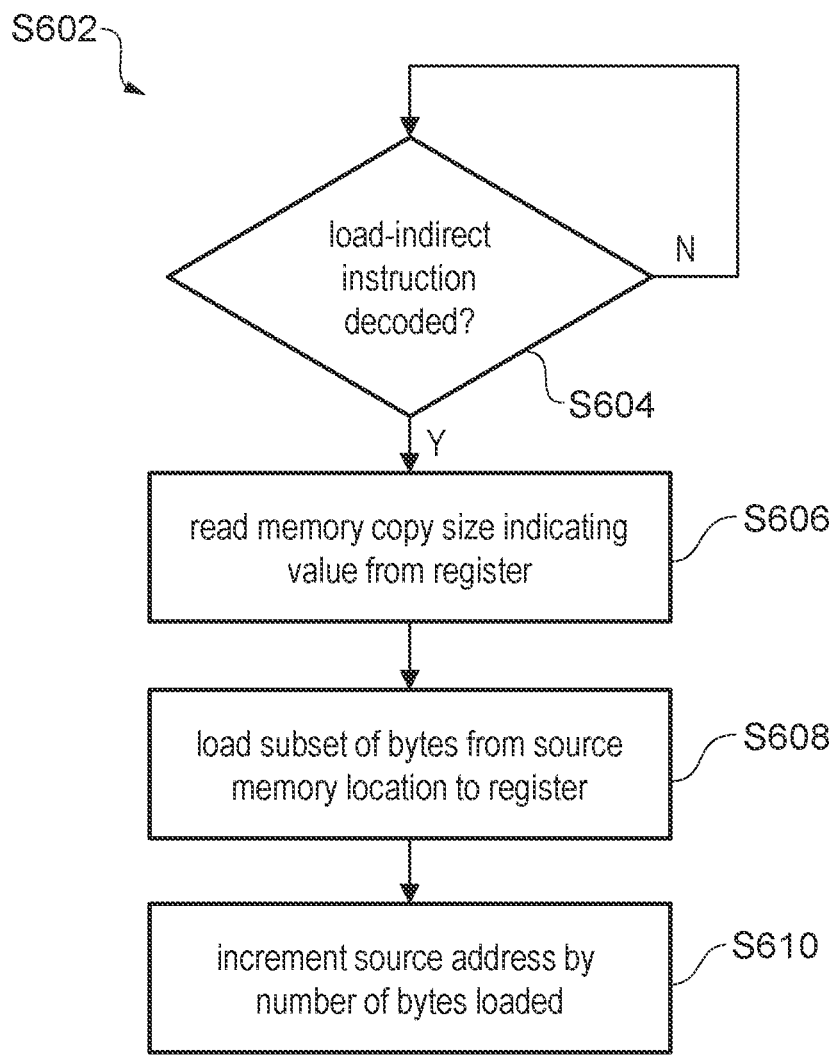
FIGS. 6A and 6B are flow diagrams illustrating examples of methods of execution of a load-indirect instruction and a store-indirect instruction.
Figure 6B:
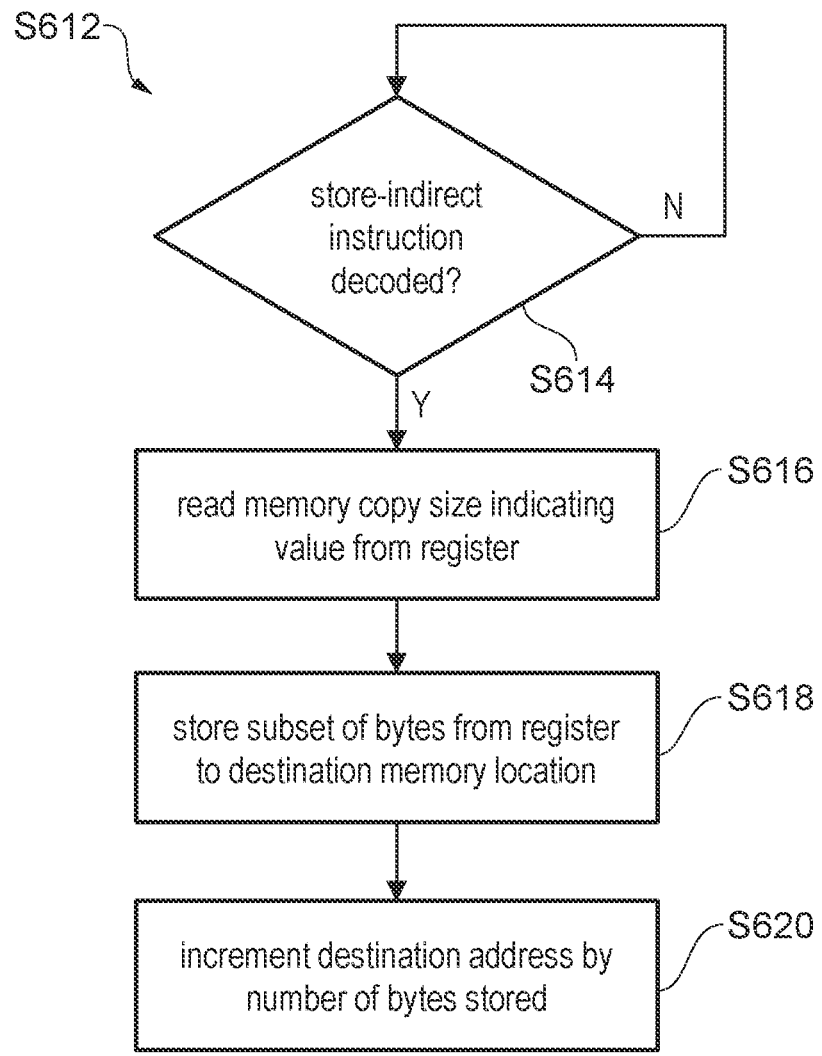

FIGS. 6A and 6B are flow diagrams illustrating examples of methods S602, S612 carried out by the processing circuitry to execute a load-indirect instruction and a store-indirect instruction. The load-indirect and store-indirect instructions whose execution is illustrated in FIGS. 6A and 6B are each examples of a data transfer instruction specifying a target memory location, a register identifier, and a number of bytes to transfer between the identified register and a memory location identified by the target memory address. In particular, the load-indirect instruction specifies, as the target memory address, the source memory address specified by a preceding memory copy size indicating instruction and specifies, as the number of bytes to transfer, the memory copy size indicating value. The data processing circuitry is responsive to the decode circuitry decoding the load-indirect instruction to copy the specified bytes from the source memory location identified by the source memory address to the identified register.

FIG. 6A shows a method S602 of executing a load-indirect instruction, the method including a step S604 of determining whether the load-indirect instruction has been decoded. The load-indirect instruction specifies the source memory address and register identifiers of a register holding the memory copy size indicating value and a register into which the subset of the total number of bytes will be loaded.

When the load-indirect instruction has been decoded, the processing circuitry executing the load-indirect instruction is configured to read S606 the memory copy size indicating value from the corresponding register. Based on the data transfer size indicating value, the processing circuitry loads S608 a number of bytes identified by the memory copy size indicating value from source memory location identified by the source memory address to the other register identified in the load-indirect instruction.

The processing circuitry executing the load-indirect instruction in this example also increments S610 the target address (the source address) by the number of bytes loaded to the register. However, it will be appreciated that this step could instead be performed in response to the decode circuitry decoding a separate instruction.

FIG. 6B is a flow diagram illustrating a method S612 performed by processing circuitry executing a store-indirect instruction. The store-indirect instruction specifies, as the target memory address, the destination memory address specified by a preceding memory copy size indicating instruction and specifies, as the number of bytes to transfer, the memory copy size indicating value. The data processing circuitry is responsive to the decode circuitry decoding the store-indirect instruction to transfer the specified bytes from the register specified by the store-indirect instruction to the destination memory location identified by the destination memory address.

The method S612 includes a step S614 of determining whether a store-indirect instruction has been decoded by the decode circuitry. When the processing circuitry determines that the store-indirect instruction has been decoded, it reads S616 the memory copy size indicating value from a register specified by the store-indirect instruction. Based on the memory copy size indicating value, the processing circuitry stores S618 the subset of bytes identified by the memory copy size indicating value from another register specified in the store-indirect instruction to the destination memory location.

In this example, the processing circuitry executing the store-indirect instruction also increments S620 the destination memory address by the number of bytes stored to the destination memory location from the register. However, it will be noted that this step could instead be performed in response to the decode circuitry decoding a separate instruction.

By iteratively executing a loop of instructions comprising a memory copy size determining instruction, a load-indirect instruction and a store-indirect instruction, according to, for example, the method S402, S502 of FIG. 4 or FIG. 5 and the methods S602, S612 of FIGS. 6A and 6B, the processing circuitry can perform a memory copy operation to copy data from a source block of memory locations to a destination block of memory locations. This loop of instructions allows any number of bytes to be copied in this way, by adjusting the number of times the loop is executed. By providing dedicated instructions to perform this functionality—in particular, by providing a dedicated memory copy size indicating value—the overhead associated with a memory copy process can be reduced, by reducing the total number of instructions that need to be executed.

Figure 7:
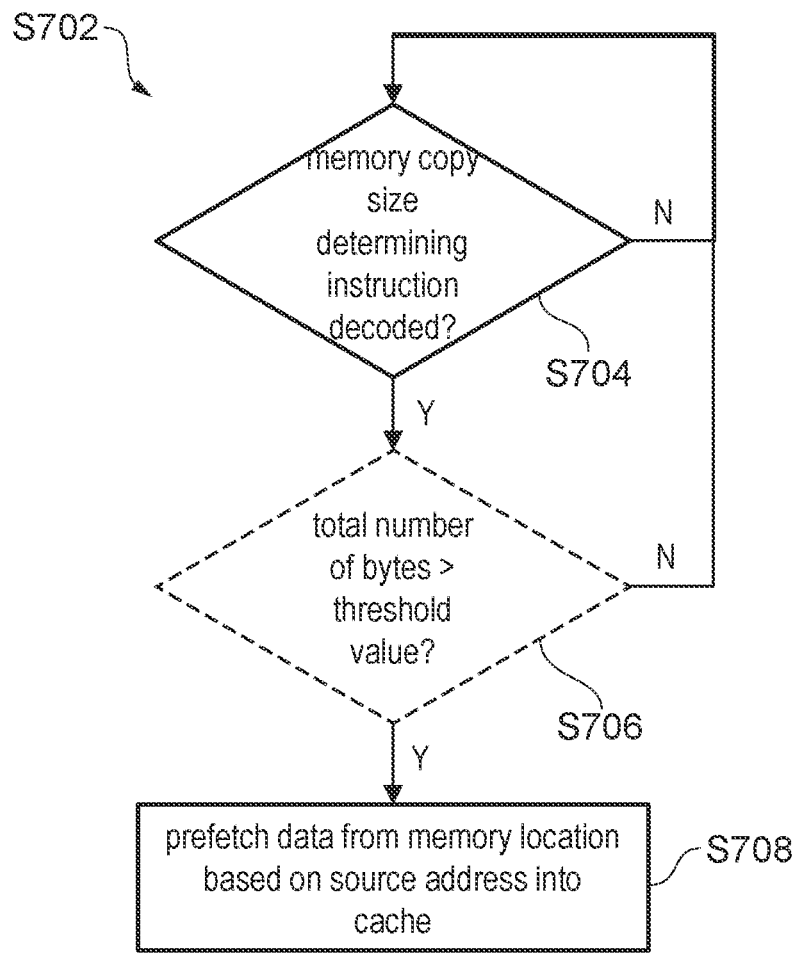
FIG. 7 is a flow diagram illustrating an example of prefetching in response to a memory copy size determining instruction.

The performance of the data processing apparatus can be improved even further by performing prefetching in response to the memory copy size determining instruction being decoded. FIG. 7 is a flow diagram illustrating an example of a method of prefetching data in response to a memory copy size determining instruction. In particular, the method includes a step S704 of determining whether a memory copy size determining instruction has been decoded by the decode circuitry. When a memory copy size determining instruction has been decoded, the processing circuitry may optimally perform a step S706 of determining whether the total number of bytes indicated by the memory copy size determining instruction is greater than a predetermined threshold value. If the total number of bytes does not exceed the threshold value, the method returns to step S704, whereas if the total number of bytes does exceed the threshold value, the method moves on to a step S708 of prefetching data into at least one cache, from a memory location determined based on the source address indicated by the memory copy size determining instruction. The number of bytes prefetched into the at least one cache may depend on the total number of bytes specified by the memory copy size determining instruction.

In examples where the optional step S706 of determining whether the total number of bytes is greater than a threshold value, the data which is prefetched may be data from addresses beyond the threshold number of bytes away from the source address. This is advantageous because it gives some time for the prefetched data to be returned before the iteration in which that data is needed is actually encountered—e.g. any data prefetched from addresses close to the source address may not be returned before the load-indirect instruction corresponding to the prefetched data is executed.

The data which is prefetched in response to the memory copy size determining instruction of a given iteration of the loop is data corresponding to later iterations of the loop. This can be particularly advantageous, because it enables load-indirect instructions in later iterations to be executed more quickly (because the data has already been fetched into the cache).

Prefetching data in response to the decoding of the memory copy size determining instruction can be particularly advantageous when the total number of bytes to be copied is large, such that a large number of iterations are required to copy all of the total number of bytes from the source block of memory locations to the destination block of memory locations. Accordingly, the method S702 may optionally include the step S706 of checking whether the total number of bytes is greater than a predetermined threshold value, as discussed above. This allows a determination to be made as to whether the improvement in performance of the memory copy operation that can be achieved by prefetching data outweighs the performance cost of executing a prefetch operation. However, it will be appreciated that this step is optional: instead, the processing circuitry may be arranged to prefetch data by default, or may be arranged not to prefetch data at all; alternatively, other criteria may be used to determine whether to prefetch data.

Figure 8:
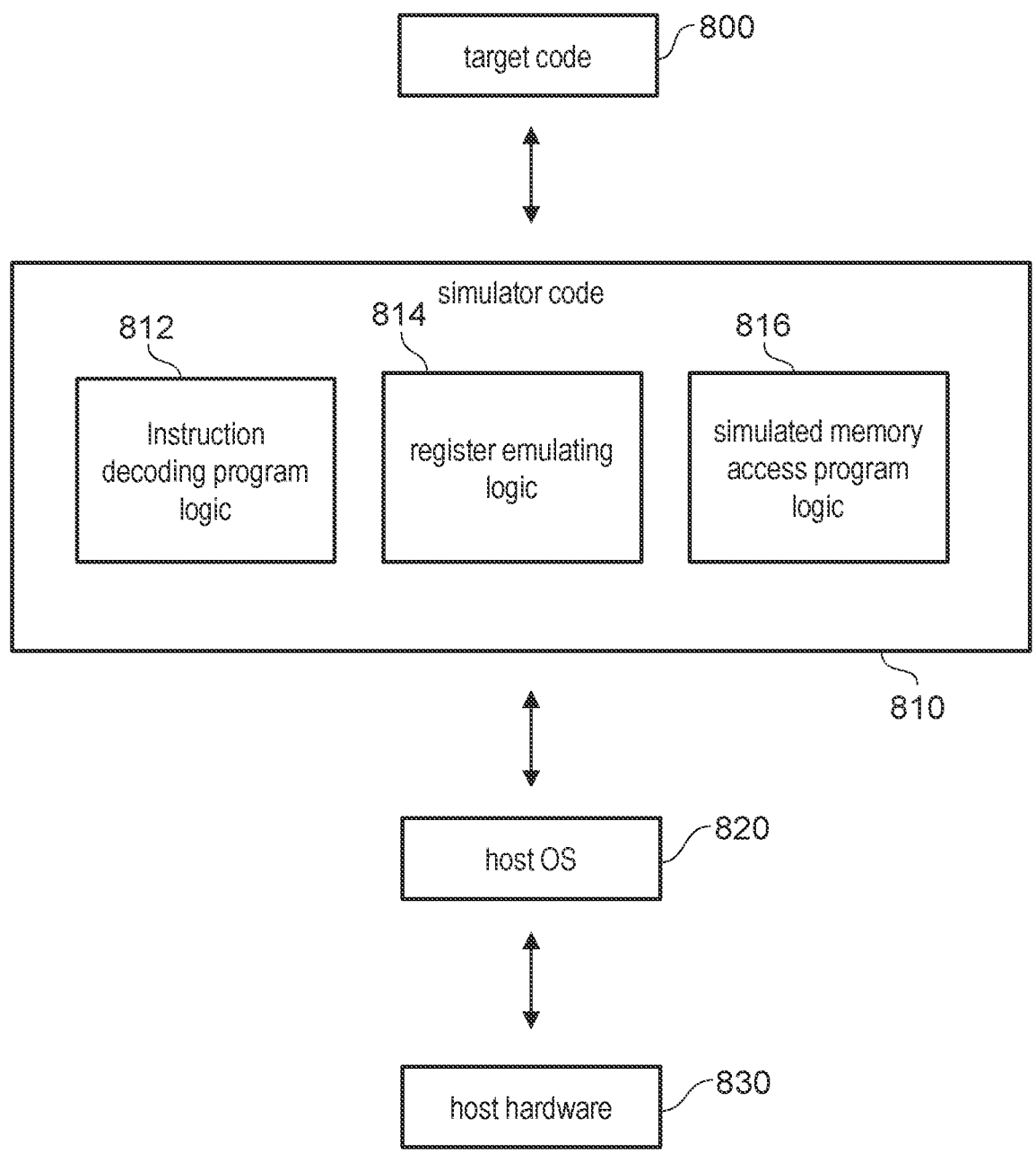
FIG. 8 schematically illustrates a simulator implementation.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host processor 830, optionally running a host operating system 820, supporting the simulator program 810. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 830), some simulated embodiments may make use of the host hardware, where suitable.

In particular, the simulator code 810 may include instruction decoding program logic 812 for decoding instructions of the target code (which may include the memory copy size determining instruction, the load-indirect instruction and/or the store-indirect instruction described above) so as to control a host data processing apparatus to perform data processing. Hence, the instruction decoding program logic emulates the functionality of the decode circuitry of a hardware apparatus as discussed above. Also, the program may include register maintenance program logic 814 which maintains a data structure (within the memory or architectural registers of the host apparatus) which represents (emulates) the architectural registers of the instruction set architecture being simulated by the program. The emulated registers may include any of the plurality of registers described in some examples above. The instruction decoding program logic includes support for the memory copy size determining instruction, the data transfer instruction (e.g. load-indirect instruction and/or store-indirect instruction) described above, which have the same functionality as described above for the hardware example. The simulator code 810 may also include simulated memory access program logic 816 to emulate the functionality of memory access circuitry to access data in the memory of the host hardware 830, for example in response to the above-described load-indirect and store-indirect instructions.

The simulator program 810 may be stored on a computer-readable storage medium (which may be a non-transitory medium), and provides a program interface (instruction execution environment) to the target code 800 (which may include applications, operating systems and a hypervisor) which is the same as the interface of the hardware architecture being modelled by the simulator program 810. Thus, the program instructions of the target code 800, including the memory copy size determining instructions, the load-indirect instructions and the store-indirect instructions described above, may be executed from within the instruction execution environment using the simulator program 810, so that a host computer 830 which does not actually have the hardware features of the apparatus 102 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
    decode circuitry configured to decode instructions; and
    processing circuitry responsive to the instructions decoded by the decode circuitry to perform data processing;
    wherein in response to the decode circuitry decoding a memory copy size determining instruction specifying as operands a source memory address, a destination memory address and a total number of bytes to be copied from a source block of memory locations indicated by the source memory address to a destination block of memory locations indicated by the destination memory address, the processing circuitry is configured to determine, based on at least one of the source memory address and the destination memory address, a memory copy size indicating value indicative of a subset of the total number of bytes to be copied;
    wherein the processing circuitry is configured to make the memory copy size indicating value available as an operand for a subsequent instruction; and
    an encoding of the memory copy size indicating value is capable of specifying, as the subset of the total number of bytes to be copied, a number of bytes other than a power of 2.

2. The apparatus of claim 1, wherein
the processing circuitry is configured to determine the memory copy size indicating value based on a position of an alignment boundary relative to at least one of the source memory address and the destination memory address.

3. The apparatus of claim 2, wherein
the processing circuitry is configured to determine the memory copy size indicating value to specify a number of bytes in the subset corresponding to a difference between an address aligned to said alignment boundary and one of the source memory address and the destination memory address.

4. The apparatus of claim 3, wherein either a load alignment or a store alignment is preferred;
when load alignment is preferred, the processing circuitry is configured to determine the memory copy size indicating value based on the difference between the aligned address and the source memory address, and
when store alignment is preferred, the processing circuitry is configured to determine the memory copy size indicating value based on the difference between the aligned address and the destination memory address.

5. The apparatus of claim 4, wherein
whether load or store alignment is preferred is fixed in hardware.

6. The apparatus of claim 4, wherein
the processing circuitry is configured to receive an indication of whether load alignment or store alignment is preferred.

7. The apparatus of claim 6, comprising:
a plurality of registers,
wherein the processing circuitry is responsive to the decode circuitry decoding the memory copy size determining instruction to read the indication of whether load alignment or store alignment is preferred from at least one of the plurality of registers.

8. The apparatus of claim 6, wherein
the indication of whether load alignment or store alignment is preferred is configurable.

9. The apparatus of claim 1, wherein
the memory copy size indicating value indicates a number of bytes in the subset that is less than or equal to a total number of bytes that can be transferred in a single data transfer.

10. The apparatus of claim 1, comprising:
a plurality of registers,
wherein the processing circuitry is configured to write the memory copy size indicating value to at least one of the plurality of registers.

11. The apparatus of claim 1, comprising:
a plurality of registers,
wherein the processing circuitry is responsive to the decode circuitry decoding a data transfer instruction specifying a target memory address and a data transfer size indicating value indicating a number of bytes, to transfer the number of bytes specified by the data transfer size indicating value between the plurality of registers and a target block of memory locations corresponding to the target address.

12. The apparatus of claim 11, wherein
the processing circuitry is responsive to the decode circuitry decoding the data transfer instruction to increment the target memory address by a value corresponding to the number of bytes specified by the data transfer size indicating value.

13. The apparatus of claim 11, wherein
an encoding of the data transfer size indicating value is capable of specifying the number of bytes as a number of bytes other than a power of 2.

14. The apparatus of claim 1, wherein
the processing circuitry is configured to determine the memory copy size indicating value based on a utilisation amount of at least one processing resource accessible to the processing circuitry.

15. The apparatus of claim 14, wherein
the at least one processing resource comprises at least one of a load buffer and a store buffer.

16. The apparatus of claim 1, wherein
the processing circuitry is responsive to the decode circuitry decoding the memory copy size determining instruction to decrement the total number of bytes to be copied by the number of bytes in the subset.

17. The apparatus of claim 1, wherein
the processing circuitry is responsive to the decode circuitry decoding the memory copy size determining instruction to begin a prefetch operation to prefetch data into at least one cache from a memory location determined based on the source memory address and the total number of bytes to be copied.

18. The apparatus of claim 17, wherein
the prefetch operation comprises comparing the total number of bytes to be copied with a threshold value, and prefetching the data when the total number of bytes exceeds the threshold value.

19. A method comprising:
decoding a memory copy size determining instruction specifying as operands a source memory address, a destination memory address and a total number of bytes to be copied from a source block of memory locations indicated by the source memory address to a destination block of memory locations indicated by the destination memory address; and
in response to decoding of the memory copy size determining instruction, determining, based on at least one of the source memory address and the destination memory address, a memory copy size indicating value indicative of a subset of the total number of bytes to be copied;
wherein the memory copy size indicating value is made available as an operand for a subsequent instruction; and
an encoding of the memory copy size indicating value is capable of specifying, as the subset of the total number of bytes to be copied, a number of bytes other than a power of 2.

20. A non-transitory storage medium storing a computer program to control a host data processing apparatus to provide an instruction execution environment for execution of target code, the computer program comprising:
instruction decoding program logic to decode instructions of the target code to control the host data processing apparatus to perform data processing,
wherein the instruction decoding program logic is responsive to a memory copy size determining instruction specifying as operands a source memory address, a destination memory address and a total number of bytes to be copied from a source block of memory locations indicated by the source memory address to a destination block of memory locations indicated by the destination memory address, to control the host data processing apparatus to determine, based on at least one of the source memory address and the destination memory address, a memory copy size indicating value indicative of a subset of the total number of bytes to be copied;

wherein the instruction decoding program logic is configured to control the host data processing apparatus to make the memory copy size indicating value available as an operand for a subsequent instruction; and an encoding of the memory copy size indicating value is capable of specifying, as the subset of the total number of bytes to be copied, a number of bytes other than a power of 2.

21. An apparatus comprising:

decode circuitry configured to decode instructions;

processing circuitry responsive to the instructions decoded by the decode circuitry to perform data processing; and a plurality of registers, wherein the processing circuitry is responsive to the decode circuitry decoding a data transfer instruction specifying a target memory address and a given general purpose register of the plurality of registers, to transfer data, having a size corresponding to a number of bytes specified by a data transfer size indicating value held in the given general purpose register, between the plurality of registers and a target block of memory locations corresponding to the target address;

the given general purpose register is a register capable of being referenced as a source operand for an arithmetic/logical instruction; and an encoding of the data transfer size indicating value is capable of specifying the number of bytes as a number of bytes other than a power of 2.

* * * * *